United States Patent Office 3,290,363
Patented Dec. 6, 1966

3,290,363
METHOD FOR SUBSTANTIALLY REMOVING ALDEHYDE CONTAMINANTS FROM VINYL ACETATE AND ALCOHOLIC SOLUTIONS THEREOF
Nobuho Saito, Ohgaki, and Yasuo Kotani, Hirakata, Japan, assignors to Nippon Gosei Kagaku Kogyo Kabushiki Kaisha, Osaka, Japan, a corporation of Japan
No Drawing. Filed Dec. 8, 1964, Ser. No. 416,916
5 Claims. (Cl. 260—499)

This application is a continuation-in-part of our copending application Serial No. 134,586, filed on August 29, 1961, now abandoned.

The present invention relates to a method for removing aldehydes from vinyl acetate or an alcoholic solution thereof. More particularly, the present invention relates to a method for recovering substantially aldehyde-free vinyl acetate from an alcoholic solution of vinyl acetate contaminated by aldehydes.

As well known, vinyl acetate of technical grade often contains a small amount of aldehydes such as acetaldehyde and crotonaldehyde as impurities. It is, however, desired to employ vinyl acetate substantially free from aldehydes in many cases, particularly in manufacturing polyvinyl alcohol by a process comprising the steps of polymerizing vinyl acetate in an alcoholic solvent such as methanol or ethanol and treating the thus obtained vinyl acetate polymer with an alkaline substance to alcoholize or hydrolyze the polymer into polyvinyl alcohol. The use of vinyl acetate contaminated by aldehydes in said process may cause much trouble such as retardation in polymerization reaction, decrease in polymerization degree of the resulting polymer, yellowish coloration of the obtained polyvinyl alcohol, etc.

Since the formation of acetaldehyde based on an ester-interchange reaction represented by the formula:

$$CH_2:CHOCOCH_3 + ROH \rightarrow CH_3CHO + ROCOCH_3$$

may occur during the polymerization step, unchanged vinyl acetate recovered from the polymerization zone by distillation contains a considerable amount of acetaldehyde with an alcohol employed as the solvent and the acetic acid ester of the alcohol in most cases, even when rectified vinyl acetate is used for polymerization. It is very difficult completely to separate aldehydes from an alcoholic solution of vinyl acetate only by distillation. The reuse of the unchanged vinyl acetate for polymerization use, therefore, may be always accompanied with difficulties.

It is an object of the present invention to provide a method for removing aldehydes contained in vinyl acetate or an alcoholic solution thereof without loss or degradation of vinyl acetate.

A particular object of the present invention is to provide a method for recovering from an alcoholic solution of unchanged vinyl acetate recovered from a polymerization zone, substantially aldehyde-free vinyl acetate or a solution thereof, which is reusable for a polymerization process.

It has now been found that those objects are successfully achieved by the method of the present invention, in which vinyl acetate or a solution thereof contaminated by aldehydes is treated with an aromatic amine and an organic acid and then distilled to recover vinyl acetate freed aldehydes. By use of the abovementioned reactive agents, aldehydes may be converted into non-distillable condensation products which can be easily separated by distillation of the vinyl acetate. A condensation reaction of those reactive agents with aldehydes may be carried out at a temperature in the range from room temperature to the boiling point of vinyl acetate. From a practical point of view, however, it is desirable, for accelerating the reaction, to operate at a temperature ranging from about 50° C. to about 73° C. which is the boiling point of vinyl acetate at atmospheric pressure. If a treated solution boils at a lower temperature than the boiling point of vinyl acetate, it is desirable usually to operate at reflux for a half hour or more.

Aniline, naphthylamines such as alpha-naphthylamine and beta-naphthylamine, and their homologues, are employed as the aromatic amine, and saturated carboxylic acids such as acetic acid, oxalic acid, etc., preferably oxalic acid, are used as the organic acid. A desired example is the combination of aniline and oxalic acid. The use of the amine without any organic acid is undesirable, as it tends to result in the increase of the content of aldehydes, thus to defeat the objects of the present invention. The use of non-aromatic amines such as aliphatic amine and alicyclic amine instead of aromatic amines may provide only poor effects. The adequate amounts of the aromatic amine and the organic acid may be varied in a wide range depending on numerous factors. In practice, however, the rang of 0.25–1 molar weight of the amine and 0.01–0.1 molar weight of the acid to 1 molar weight of aldehydes to be removed, is preferably employed in most cases.

When a vinyl acetate solution containing an alcohol such as methanol or ethanol is treated by the method of the present invention, the following procedure is recommended to prevent the additional formation of aldehydes which may be caused by an ester-interchange reaction of vinyl acetate with the alcohol during the period of reflux and distillation, that is, the alcoholic solution of vinyl acetate is distilled while adding water into a distillation column from the top of the column by means of an extractive distillation to separate vinyl acetate from an azeotropic mixture consisting of vinyl acetate and the alcohol; and then the thus obtained alcohol-free vinyl acetate is treated by the method of the present invention as described above to remove aldehydes. Particularly, that procedure may be effectively applied for the purpose of recovering substantially aldehyde-free vinyl acetate from the mixture consisting of vinyl acetate, methanol, methyl acetate and aldehydes; that mixture being obtained by distillation from a polymerization zone in which vinyl acetate dissolved in methanol is polymerized as a step in the process of manufacturing polyvinyl alcohol. In such case, the mixture is distilled while adding water to separate it into a distillate comprising vinyl acetate, methyl acetate and the aldehydes and a bottom comprising an aqueous solution of methanol; and then that distillate is treated by the method of the present invention to recover vinyl acetate freed from the aldehydes.

According to the present invention, vinyl acetate, or an alcoholic solution thereof contaminated by aldehydes, may be easily purified to obtain substantially aldehyde-free vinyl acetate. In consequence, the troubles caused by aldehydes in the process of manufacturing polyvinyl alcohol may be eliminated and the unchanged vinyl acetate recovered from the polymerization zone may be reused for polymerization without any difficulties.

The present invention is illustrated in detail by the following examples. Percentages specified are by weight.

*Example 1*

Nine hundred (900) grams of the solution consisting of 45.8% of vinyl acetate, 30.5% of methanol, 17.6% of methyl acetate, 6.0% of acetaldehyde and 0.0036% of crotonaldehyde were charged in a glass flask provided with a reflux condenser. The charge was mixed with 114 grams of aniline and 3.3 grams of oxalic acid, and then refluxed for an hour at about 59° C., which is the boiling point of the azeotropic mixture consisting of vinyl acetate and methanol. The results of the analysis of the solution treated by the foregoing procedure showed that the content of acetaldehyde and crotonaldehyde in the solution decreased to 0.049% and 0.00026%, respectively.

*Example 2*

One thousand (1000) grams of the solution consisting of 53.2% of vinyl acetate, 45.4% of ethanol and 1.4% of acetaldehyde were refluxed at about 67° C. which is the boiling point of the azeotropic mixture consisting of vinyl acetate and ethanol, together with 45.3 grams of alpha-naphthylamine and 1.8 grams of acetic acid in a glass flask provided with a reflux condenser. The results of analysis carried out at intervals of one hour showed that the content of acetaldehyde decreased to 0.146% after reflux for one hour then to 0.098% at the end of two hours, and furthermore to 0.062% at the end of four hours.

*Example 3*

The solution consisting of 41.4% of vinyl acetate, 42.9% of methanol, 12.7% of methyl acetate and 3.0% of acetaldehyde was charged into an extractive distillation column at a rate of 100 kilograms per hour, and was distilled while adding water into the column at a rate of 65 kilograms per hour to effectuate separation of the components. A distillate obtained from the top of the column separated into an aqueous layer and an organic liquid layer consisting of 71.1% of vinyl acetate, 21.8% of methyl acetate, 5.1% of acetaldehyde, 1.1% of methanol and 0.9% of water. The organic liquid layer was refluxed for 15 minutes together with 10.8 kilograms of aniline and 1.0 kilogram of oxalic acid per 100 kilograms of the organic liquid layer, and then was distilled to obtain substantially acetaldehyde-free vinyl acetate.

While we have shown and described what we believe to be the best embodiments of our invention, it will be apparent to those skilled in the art that various changes and modifications may be made therein without departing from the spirit and scope of the invention as defined in the appended claims.

What is claimed is:

1. A method for removing aldehydes contained in vinyl acetate, which comprises treating vinyl acetate contaminated by aldehydes with 0.25–1 molar weight of an aromatic amine selected from the group consisting of aniline and naphthylamines and 0.01–0.1 molar weight of oxalic acid per 1 molar weight of aldehydes to be removed, at a temperature in the range of from 50° C. to the boiling point of vinyl acetate, and then distilling the vinyl acetate.

2. A method as defined in claim 1, wherein the vinyl acetate is present in a solution consisting essentially of the contaminated vinylacetate in an alcohol of the group consisting of methanol and ethanol.

3. A method as defined in claim 2, wherein the alcoholic solution consists essentially of vinyl acetate, methanol, methyl acetate and aldehydes.

4. A method for recovering substantially aldehyde-free vinyl acetate from a solution of vinyl acetate in an alcohol selected from the group consisting of methanol and ethanol, which comprises the steps of: (1) distilling the solution while adding water thereto to effectuate an extractive distillation which separates the vinyl acetate from the alcohol, and (2) treating the thus separated vinyl acetate with 0.25–1 molar weight of an aromatic amine selected from the group consisting of aniline and naphthylamines and 0.01–0.1 molar weight of oxalic acid per 1 molar weight of aldehyde to be removed at a temperature in the range of from 50° C. to the boiling point of vinyl acetate and then distilling the vinyl acetate.

5. A method for recovering substantially aldehyde-free vinyl acetate from a mixture consisting of vinyl acetate, methanol, methyl acetate and aldehydes, which comprises the steps of: (1) distilling the mixture while adding water thereto to effectuate an extractive distillation which separates the mixture into a distillate comprising vinyl acetate, methyl acetate and the aldehydes and a bottom comprising an aqueous solution of methanol, and (2) treating the distillate with 0.25–1 molar weight of aniline and 0.01–0.1 molar weight of oxalic acid per 1 molar weight of aldehyde to be removed, at a temperature in the range from 50° C. to the boiling point of the distillate and then distilling the vinyl acetate.

References Cited by the Examiner

UNITED STATES PATENTS 1,963,968   6/1934   Burke et al. _____ 260—499

LORRAINE A. WEINBERGER, *Primary Examiner.*

V. GARNER, *Assistant Examiner.*